US009961053B2

(12) United States Patent
Yedidi et al.

(10) Patent No.: US 9,961,053 B2
(45) Date of Patent: May 1, 2018

(54) DETECTING COMPROMISED CREDENTIALS

(71) Applicant: Dropbox, Inc., San Francisco, CA (US)

(72) Inventors: Kapil Yedidi, San Francisco, CA (US); Anton Mityagin, San Francisco, CA (US); Sean Byrne, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days. days.

(21) Appl. No.: 15/167,972

(22) Filed: May 27, 2016

(65) Prior Publication Data
US 2017/0346797 A1    Nov. 30, 2017

(51) Int. Cl.
*H04L 29/06* (2006.01)
(52) U.S. Cl.
CPC ............ *H04L 63/06* (2013.01); *H04L 63/083* (2013.01); *H04L 63/14* (2013.01)
(58) Field of Classification Search
CPC ....... H04L 63/06; H04L 63/14; H04L 63/083; H04L 63/08; H04L 9/3226
USPC .......................................................... 726/6
See application file for complete search history.

(56) References Cited

U.S. PATENT DOCUMENTS

| 5,204,966 | A | | 4/1993 | Wittenberg et al. |
| 5,491,752 | A | * | 2/1996 | Kaufman ............. G06F 21/335 380/30 |
| 7,600,094 | B1 | * | 10/2009 | Jin ....................... G06F 17/3033 707/999.1 |
| 8,495,379 | B2 | | 7/2013 | Rane et al. |
| 8,539,599 | B2 | | 9/2013 | Gomez et al. |
| 8,615,793 | B2 | | 12/2013 | Theimer et al. |
| 8,769,680 | B2 | | 7/2014 | Stading |
| 8,978,150 | B1 | | 3/2015 | Rosen et al. |
| 9,003,195 | B1 | | 4/2015 | Leininger et al. |

(Continued)

OTHER PUBLICATIONS

How To: Disallow previously used passwords "Github.com URL: https://github.com/plataformatec/devise/wiki/How-To:-Disallow-previously-used-passwords Last Edited: Nov. 6, 2014".

(Continued)

*Primary Examiner* — Syed Zaidi
(74) *Attorney, Agent, or Firm* — DLA Piper LLP US

(57) ABSTRACT

Disclosed are systems, methods, and non-transitory computer-readable storage media for detecting compromised credentials. In some implementations, a content management system can receive information identifying compromised login credentials (e.g., account identifier, password, etc.) from a third party server. The login credentials can be represented by a first hash value generated using a hashing algorithm. When a user logs in to the content management system the user can provide the user's account identifier and password for the content management system. The content management system can generate a second hash value from the user-supplied password using the same hashing algorithm used for the compromised login credentials. The content management system can determine whether the second hash value matches the first hash value and prompt the user to provide a new password for the user's content management system account when the second hash value matches the first hash value.

21 Claims, 6 Drawing Sheets

(56) References Cited

U.S. PATENT DOCUMENTS

| | | |
|---|---|---|
| 9,071,645 B2 | 6/2015 | Henderson et al. |
| 9,491,164 B1 * | 11/2016 | Fay ........................ H04L 63/083 |
| 9,680,860 B1 * | 6/2017 | Wallace .............. H04L 63/1433 |
| 2010/0191977 A1 * | 7/2010 | Landrock .............. G06F 21/645 |
| | | 713/176 |
| 2011/0087888 A1 * | 4/2011 | Rennie .................... G06F 21/41 |
| | | 713/182 |
| 2015/0254452 A1 | 9/2015 | Kohlenberg et al. |

OTHER PUBLICATIONS

Adobe Has Been Hacked! "Lastpass.com URL: https://lastpass.com/adobe/".

* cited by examiner

DETECTING COMPROMISED CREDENTIALS

BACKGROUND

Malicious actors are frequently trying to gain access to users' personal information. One of the ways that these malicious actors attempt to gain access to a user's personal data is by stealing the user's login credentials (e.g., account identifier, password, etc.) for an account (e.g., email account, cloud storage account, personal bank account, etc.) and using the user's login credentials to access the user's personal information stored in a corresponding account. This breach of security can provide the malicious actor to other user accounts as well. For example, often a user will use the same account identifier (e.g., email address) and password for multiple different accounts. Thus, if the malicious actor has gained access to one user account, the malicious actor can often gain access to other user accounts using the same login credentials.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for detecting compromised credentials. In some embodiments, a content management system can receive information identifying compromised login credentials (e.g., account identifier, password, etc.) from a third party server. The login credentials can be represented by a first hash value generated using a hashing algorithm. When a user logs in to the content management system the user can provide the user's account identifier and password for the content management system. The content management system can generate a second hash value from the user-supplied password using the same hashing algorithm used for the compromised login credentials. The content management system can determine whether the second hash value matches the first hash value and prompt the user to provide a new password for the user's content management system account when the second hash value matches the first hash value.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for ***.

Figure 1:
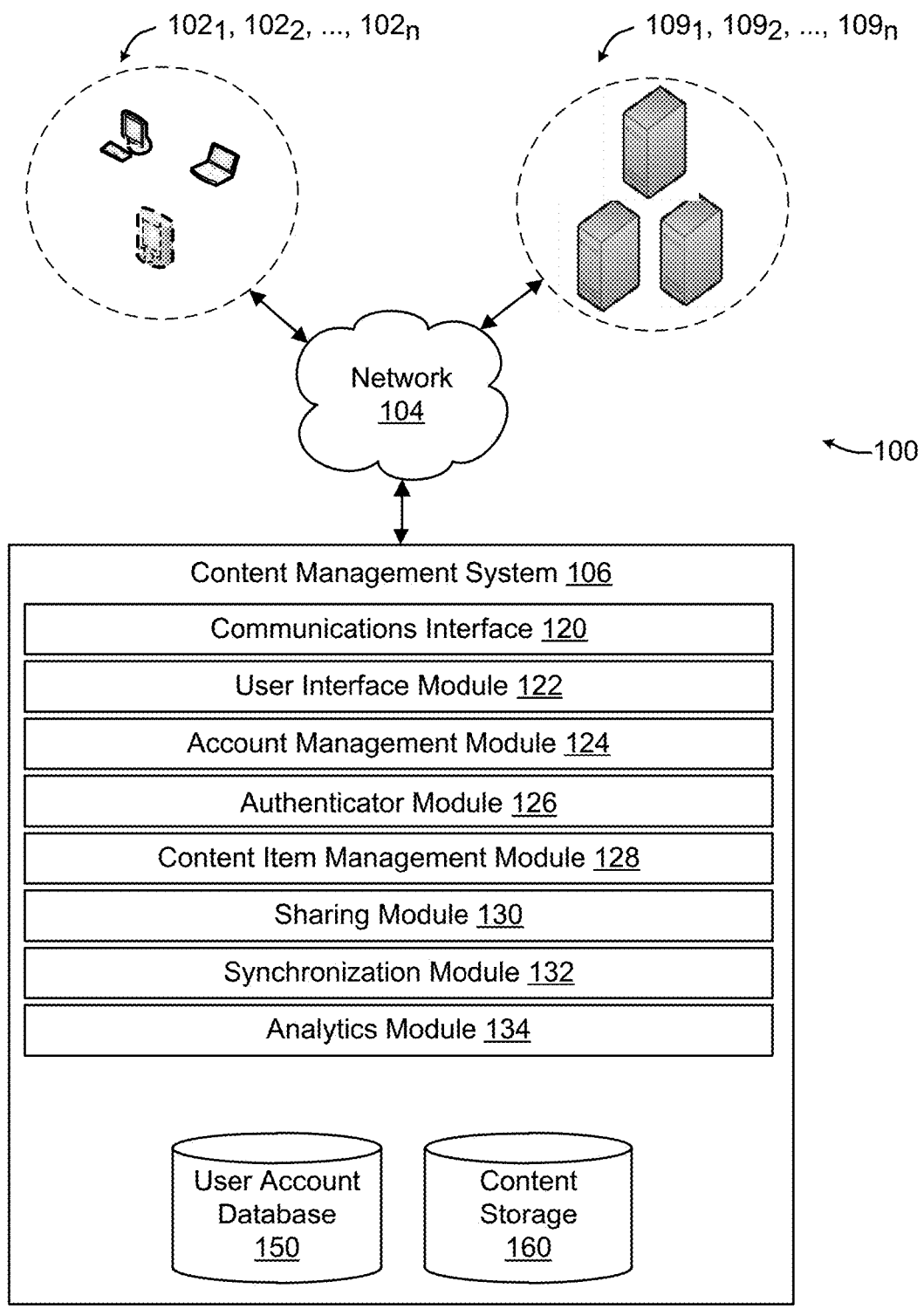
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2, \ldots, 102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109₁, 109₂, ..., 109ₙ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
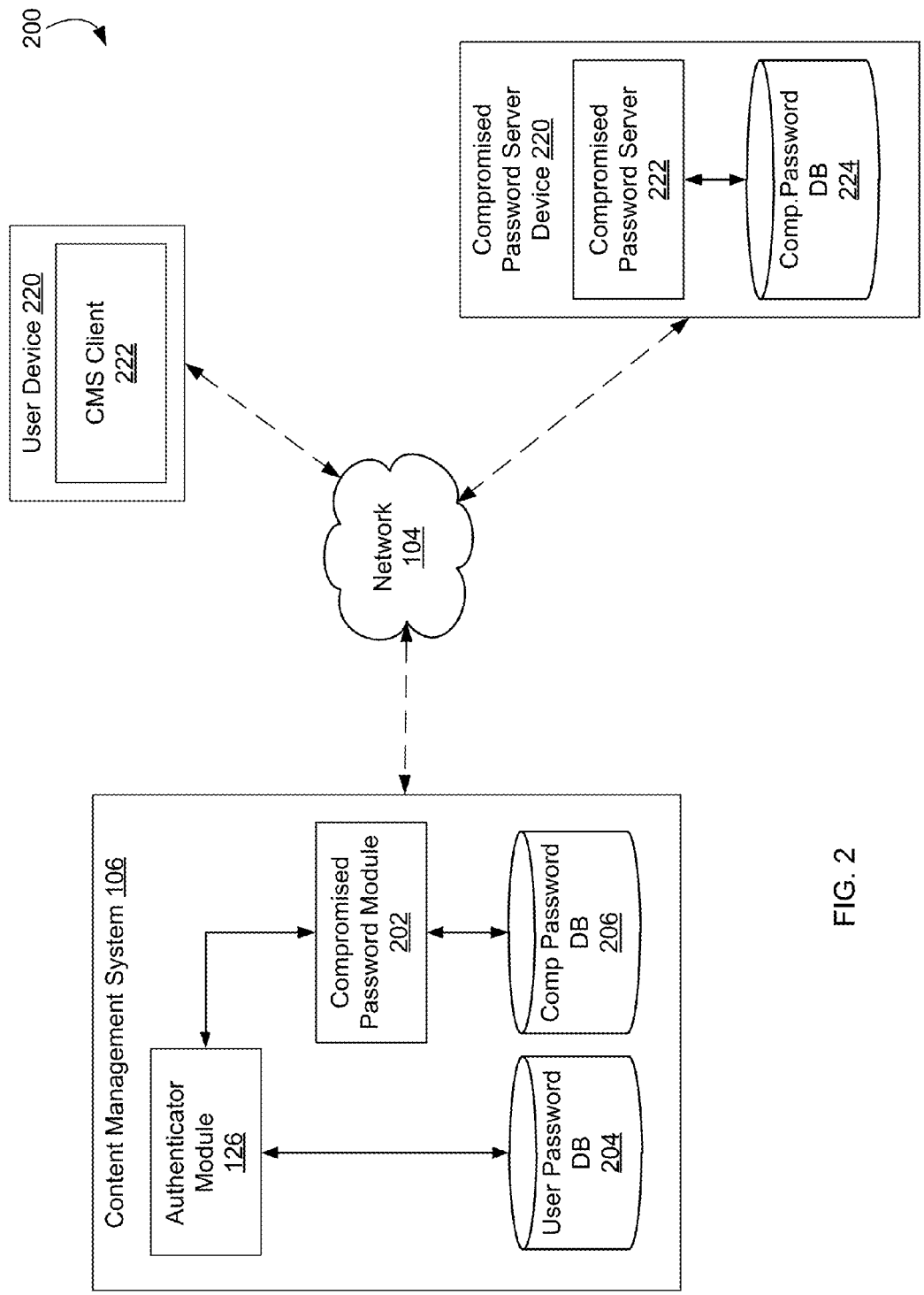
FIG. 2 is a block diagram of an example system for detecting compromised login credentials.

FIG. 2 is a block diagram of an example system 200 for detecting compromised login credentials. In some embodiments, system 200 can include content management system 106, described above. Content management system 106 can include authenticator module 126 for authenticating users when they attempt to log in to content management system 106. For example, a user of user device 220 can use content management system (CMS) client 222 (e.g., native client, web client, browser, etc.) to log in to content management system 106 through network 104. User device 220 can correspond to client device 102ᵢ of FIG. 1, for example.

In some implementations, authenticator module 126 can receive the login credentials for the user's account with content management system 106 from CMS client 222. For example, authenticator module 126 can receive the user's CMS account identifier (e.g., user name, email address, etc.) and password from CMS client 222 and compare the password received from CMS client to a stored password associated with the user account identifier in user password database 204.

In some implementations, passwords stored in user password database 204 can be stored as hash values. For example, rather than storing the user's password and risk someone stealing the password, a hash value can be calculated based on the user's password and the hash value can be stored instead of the user's password. The password can be provided as input to a hashing algorithm, for example, and the resultant value can be stored in user password database 204 in lieu of the user's actual password. In some implementations, hash values generated by content management system 106 can be generated based on a user-specific salt value. The salt value can be, for example, a randomly generated value assigned to a user account or some user-specific data obtained from the user's account (e.g., a user-provided bit of personal information, a pet's name, mother's maiden name, account identifier, user name, etc.) and stored in user password database 204. By including a salt value as input to the hashing algorithm along with the user's password, content management system 106 can ensure that the password hash value generated for a user account is different from other user accounts that might have the same password.

In some implementations, hash values generated by content management system 106 can be generated based on a global secret key (e.g., pepper value) of content management system 106. For example, the pepper value can be a private encryption key used by content management system 106 or some other secret value stored separately from user password database 204 by content management system 106. By using a pepper value stored separately from user password database 204, content management system 106 can ensure that a malicious user who gains access to user password database 204 is still unable to recreate the user password hash value (and thereby determine the user's password) because the malicious user will not have the pepper value which is stored separately from user password database 204. In some implementations, content management system 106 can generate the user password hash value based on a combination of password, salt value, and/or pepper value. Thus, the password hash values stored in user password database 204 will be unique between users and cannot be used to determine the user's password.

In some implementations, the password hashing algorithm used by content management system 106 can use encryption technologies to generate the password hash value. For example, instead of or in addition to merely generating a hash value based on a user's password (e.g., and salt and pepper values), content management system 106 can use a cryptographic hash function (e.g., Secure Hash Algorithms 1-5) to generate the password hash value for a user account.

When the user provides the user's account identifier and password, authenticator module 126 can generate a hash value for the received password and compare the generated hash value with the hash value stored in user password database 204 to determine whether the user provided the correct password. For example, if the user provides the same password that generated the stored hash value, then the hash value generated for the password received at login will be the same as the stored hash value. When the hash values are the same, then authenticator module 126 can determine that the user has provided the correct password (e.g., the user is authenticated) when logging in to content management system 106.

Sometimes, a user will use the same credentials for multiple accounts with different systems, vendors, merchants, etc. For example, to reduce the number of user name and password combinations that the user must memorize, the user may use the same user name and password combination to access the user's account with content management system 106, the user's account with a social media website, and/or the user's account with a banking website. However, if a malicious actor (e.g., person, device, etc.) obtains the user's user name and password combination for the social media website and/or the banking website (e.g., by hacking the website, phishing attempts, etc.), the malicious actor can use the user's user name and password to access content management system 106. Thus, content management system 106 can be configured to detect when a user is using a compromised password (e.g., a password that may have been stolen by a malicious actor) and prompt the user to select a new password.

In some implementations, content management system 106 can include compromised password module 202. For example, compromised password module 202 can be a subcomponent of authenticator module 126 or a separate process running on content management system 106. Compromised password module 202 can be configured to detect when the user is using a compromised password, as described below.

In some implementations, compromised password module 202 can be configured to receive compromised password data from compromised password server device 220. For example, compromised password server device 220 can include compromised password server 222 (e.g., a process, daemon, etc.). Compromised password server 222 can receive compromised credentials (e.g., account identifiers—password combinations) from various sources and store the compromised credentials in compromised password database 224. Compromised password server 222 can send the compromised credentials in compromised password database 224 to compromised password module 202 on content management system 106. For example, compromised password server 222 can send compromised password data updates to compromised password module 202 periodically or whenever compromised password database 224 is updated with new compromised passwords.

In some implementations, compromised password module 202 can store received compromised passwords in compromised password database 206. For example, compromised password module 202 can receive compromised password data from compromised password server 222, as described above. In some implementations, the compromised password data can include user account identifiers (e.g., user names, email addresses, etc.) and passwords. However, in some implementations, the passwords in the compromised password data can be represented by hash values. For example, before the compromised password data is sent to compromised password module 202, compromised password server 222 (or some other device) can generate hash values based on the compromised passwords. For example, a password can be provided as input to a hashing algorithm or function that generates a hash value from the provided password. The hashing algorithm used by compromised password server 222 can be different than the hashing algorithm used by content management system 106 to obfuscate and secure user account passwords in user password database 204, for example. Compromised password server 222 can then send the user account identifiers and password hash values to compromised password module 202 in the compromised password data.

In some implementations, compromised password module 202 can rehash the compromised passwords received in the compromised password data. For example, compromised password module 202 can input the password hash values received in the compromised password data to the hashing algorithm used to generate password hash values for user password database 204. Thus, while the password hash values received in the compromised password data may be easily reversed to generate the corresponding password, by hashing the password hash values again using the more secure hashing algorithm used for user password database 204 (e.g., the password hashing algorithm used by content management system 106), compromised password module 202 can ensure the that the actual passwords received in the compromised password data can never be determined.

In some implementations, the password hash values stored in user password database 204 and the password hash values stored in compromised password database 206 can be generated using different hashing algorithms (e.g., hash functions, hashing inputs, etc.). For example, the password hash values stored in user password database 204 can be generated using a first hashing algorithm 'A' (e.g., SHA-1, SHA-2, SHA-3, etc.), while the password hash values stored in compromised password database 206 can be generated using a second hashing algorithm 'B' (e.g., MD5). Thus, while content management system 106 may store data corresponding to both content management system user credentials and known compromised credentials, content management system 106 cannot compare the user password data in user password database 204 to the compromised password data in compromised password database 206 because the password hash values stored in each database are generated using different hashing algorithms and/or hashing algorithm inputs that may generate different values for the same passwords.

In some implementations, content management system 106 can check a user password against the compromised password database when the user attempts to log in to content management system 106. For example, while content management system 106 may not be able to compare password hash values between user password database 204 and compromised password database 206, content management system 106 can compare the user password provided by the user at login to the password hash values stored in compromised password database 206. For example, since content management system 106 receives an unhashed password from the user at login, content management system 106 can generate a hash value based on the user-provided password using the same hashing algorithm (e.g., hashing algorithm 'B') and hashing algorithm inputs used to generate the hash values in compromised password database 206. When the passwords in compromised password database 206 have been hashed twice (e.g., rehashed, as described above), then content management system 106 can rehash the hash value generated using hashing algorithm 'B' using hashing algorithm 'A'. If the resultant password hash value (e.g., hashed once or hashed twice) matches a password hash value stored in compromised password database 206, then content management system 106 can determine that the user's password has been compromised.

Thus, in some implementations, when authenticator module 126 receives user login credentials (e.g., account identifier, password, etc.) from CMS client 222 on user device 220, authenticator module 126 can determine whether the login credentials are valid and determine whether the login credentials are compromised. For example, to determine whether the login credentials are valid, authenticator module can compare the account identifier (e.g., user name, email address, etc.) in the login credentials to account identifiers stored in user password database 204. When the account identifier exists in user password database 204, authenticator module 126 can generate a hash value based on the password in the user login credentials according to the hash algorithm used to generate the password hash values stored in user password database 204. Authenticator module 126 can then compare the generated password hash value to the password hash value stored in association with the account identifier in user password database 204. If the generated password hash value matches (e.g., corresponds to) the stored password hash value, then authenticator module 126 can determine that user has been authenticated as the user corresponding to the content management system account corresponding to the account identifier.

After authenticating the user, authenticator module 126 can send the login credentials to compromised password module 202. Upon receipt of the login credentials, compromised password module 202 can search compromised password database 206 for the account identifier (e.g., user name, email address, etc.) specified in the login credentials. If the account identifier is not found, compromised password module 202 can send a message to authenticator module indicating that the login credentials are not in compromised password database 206 (e.g., the user's login credentials are not compromised).

When the account identifier is found in compromised password database 206, compromised password module 202 can generate a hash value based on the unhashed password in the login credentials according to the hashing algorithm (e.g., hashing algorithm 'B') used to generate the hash values stored in compromised password database 206. For example, the user-provided password can be used as input to hashing algorithm 'B' to generate the hash value. When the password hash values in compromised password database 206 have been rehashed, then compromised password module 202 can rehash the generated hash value using the first hashing algorithm.

Compromised password module 202 can then compare the generated password hash value (e.g., the hashed or rehashed password hash value) to the password hash values associated with the user's account identifier in compromised password database 206. If the generated password hash value is not found in association with the user's account identifier in compromised password database 206, then compromised password module 202 can send a message to authenticator module 126 indicating that the login credentials are not in compromised password database 206 (e.g., the user's login credentials are not compromised). When the generated password hash value is found in association with the user's account identifier in compromised password database 206, then compromised password module 202 can send a message to authenticator module 126 indicating that the login credentials are in compromised password database 206 (e.g., the user's login credentials are compromised).

In some implementations, authenticator module 126 can invalidate the user's password when compromised password module 202 indicates that the user's password has been compromised. For example, authenticator module 126 can set a value in user password database indicating that the user's password has expired. Authenticator module 126 can copy the expired password hash value associated with the user's account in user password database 204 in a collection of compromised passwords associated with the user's account identifier in user password database 204. By storing the compromised passwords, authenticator module 126 can prevent the user from selecting a compromised password for the user's content management system account in the future.

In some implementations, authenticator module 126 can prompt the user to select a new password for the user's content management system account. For example, authenticator module 126 can send an email to the user's email account specified in the user's content management system account data (e.g., the account identifier). The email can include a token that allows the user to select a hyperlink in the email to invoke a CMS client interface (e.g., a webpage) for selecting a new password and sending the newly selected password to authenticator module 126.

Upon receipt of the new password, authenticator module 126 can compare the new password to the collection of compromised passwords. For example, authenticator module can generate a hash value based on the newly selected password according to the hashing algorithm used for user password database 204 and compare the generated password hash value to the password hash values stored in the collection of compromised password hash values associated with the user's account identifier in user password database 204. When the generated password hash value matches a compromised password hash value (e.g., exists in the collection of compromised password hash values), then authenticator module 126 can prompt the user to select a different password. When the generated password hash value does not matches a compromised password hash value (e.g., does not exist in the collection of compromised password hash values), then authenticator module 126 can save the generated hash value in association with the user's account identifier in user password database 204 and allow the user access to the user's account in content management system 106.

Figure 3:
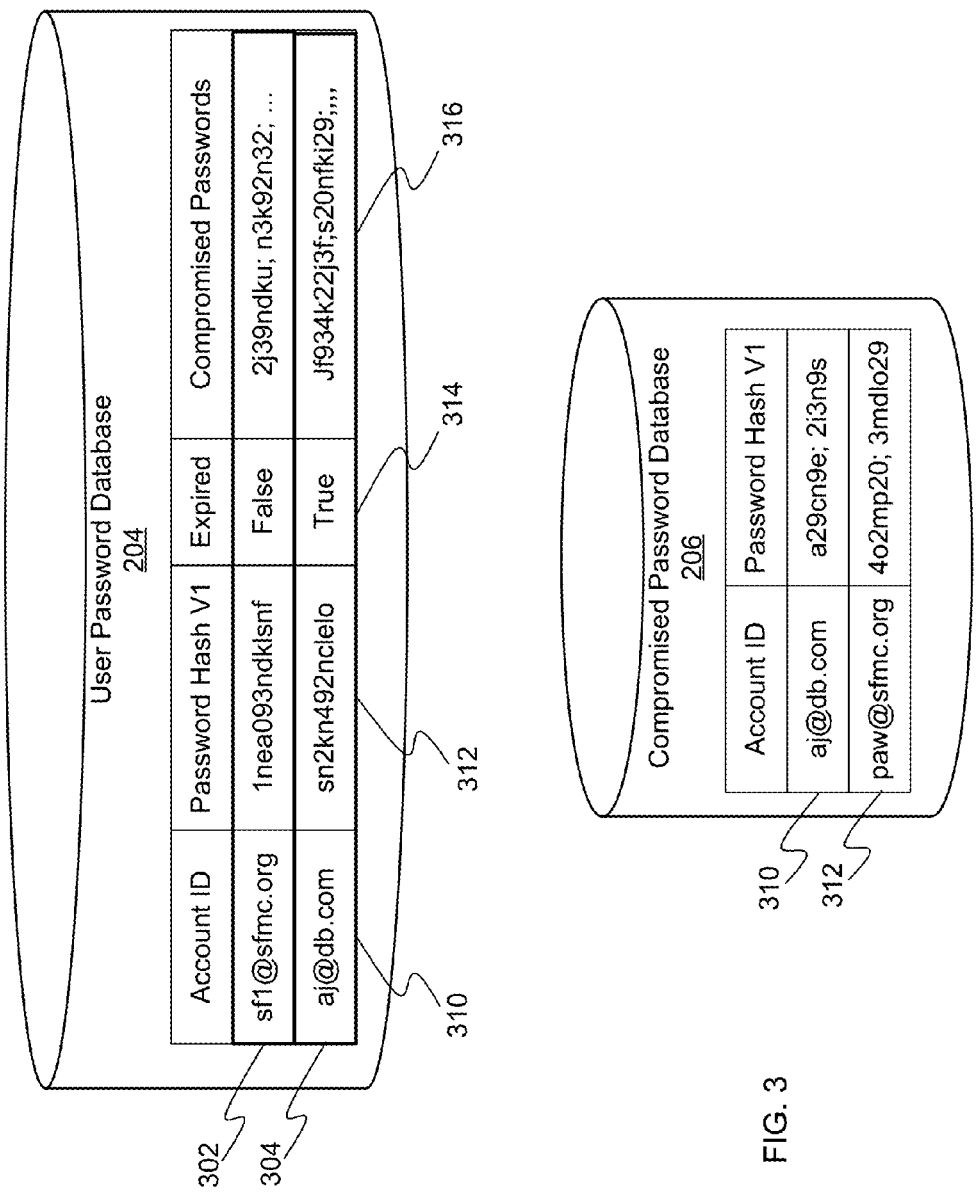
FIG. 3 illustrates example login credential databases.

FIG. 3 illustrates example login credential databases 204 and 206. In some implementations, user password database 204 can include a record (e.g., record 302, record 304) for each user account associated registered with content management system 106. In some implementations, each record can include an account identifier. For example, the account identifier can be a user name, email address, or other unique identifier. Each record can include a current password hash value. For example, the current password hash value can be generated from the user's current password using the hashing algorithm 'A' described above. Each record can include an expired password flag. For example, the expired password flag (e.g., true, false) can indicate whether the user should be required to provide a new password. The user can be required to provide a new password when a period of time has elapsed (e.g., every 3, 6, 12 months) or when the user's password has been invalidated or compromised. Each record can include a compromised password list. For example, the compromised password list can include passwords content management system 106 has determined have been compromised, as described herein. When a current password has been compromised, content management system 106 can move the current password hash value into the compromised password list.

When a user logs in (e.g., user provides account identifier and unhashed password) to content management system 106, content management system 106 can compare the user's account identifier (e.g., aj@db.com) to the account identifiers stored in the records in user password database 204. Content management system 106 can determine that record 304 includes the user-provided account identifier (e.g., field 310). Content management system 106 can then generate a password hash value based on the user-provided password using hashing algorithm 'A' and compare the generated password hash value to the current password hash value stored in record 304 (e.g., field 312). When the hash values match (e.g., are the same value), then content management system 106 can authenticate the user for the identified user account.

After authenticating the user, content management system 106 can determine whether the user's password has been compromised by comparing the user-provided password to data in compromised password database 206. In some implementations, compromised password database 206 can include records for account identifiers that have compromised passwords. For example the account identifiers can be account identifiers for user accounts with other systems (e.g. other than content management system 106). For example, record 310 can include an account identifier and corresponding password (e.g., password hash value) used for an online banking web site. Record 312 can include an account identifier and corresponding password (e.g., password hash value) for a social media website account, online dating website account, or any other account that a user might have with any other system.

The password hash value stored for each record in compromised password database 206 can be a hash value generated using one or more hashing algorithms, as described above. For example, the password hash value can be generated using hashing algorithm 'B' described above. The password hash value can be generated using hashing algorithm 'B' and hashing algorithm 'A', as described above.

Content management system 106 can compare the user-provided account identifier (e.g., aj@db.com) to the account identifier in each record (e.g., record 310, record 312) to determine that the user-provided account identifier matches the account identifier in record 310. Content management system 106 can then compare the user-provide password to the password hash values stored in record 310. For example, content management system 106 can provide the user-provided password as input to hashing algorithm 'B' to generate a first password hash value. In some implementations, when the password hash values received from compromised password server 222 have been rehashed by content management system 106 using hashing algorithm 'A' and stored in compromised password database 206, content management system 106 can rehash the first password hash value generated from the user-provided password to generate a second password hash value by providing the first password hash value as input to hashing algorithm 'A'.

Content management system 106 can then compare the first password hash value (or the second password hash value when rehashed) to the password hash value (or values) stored in record 310 to determine whether the user's current password for the user's content management system account has been compromised. For example, when the first password hash value (or the second password hash value) corresponds to one of the password hash values stored in record 310, then content management system 106 can determine that the user's password has been compromised.

When content management system 106 determines that the user's password is compromised, content management system 106 can require the user to select a new password. For example, in response to determining that the user's password is compromised, content management system 106 can set the expired password flag (e.g. field 314) in record 304 to true to indicate that the user should be required to provide a new password for the user's content management system account. In response to determining that the user's password is compromised, content management system 106 can copy the user's current password hash value (e.g., in field 312) into the list of compromised passwords stored in field 316 of record 304.

Content management system 106 can then prompt the user to provide a new password for the user's content management system account. For example, content management system 106 can send the user an email to the user's registered email account (e.g., account identifier), prompting the user to provide a new password. When the user subsequently provides a new password, content management system 106 can compare the new password (e.g. a hash value generated from the new password) to the passwords stored in the compromised password list (e.g., field 316) associated with the user's account (e.g., record 304) in user password database 204. If the password (e.g., the generated hash value) exists in the compromised password list, then content management system 106 can prompt the user to select a different password. The prompting-comparing cycle can continue until the user selects a new password that is not in the compromised password list for the user account.

Figure 4:
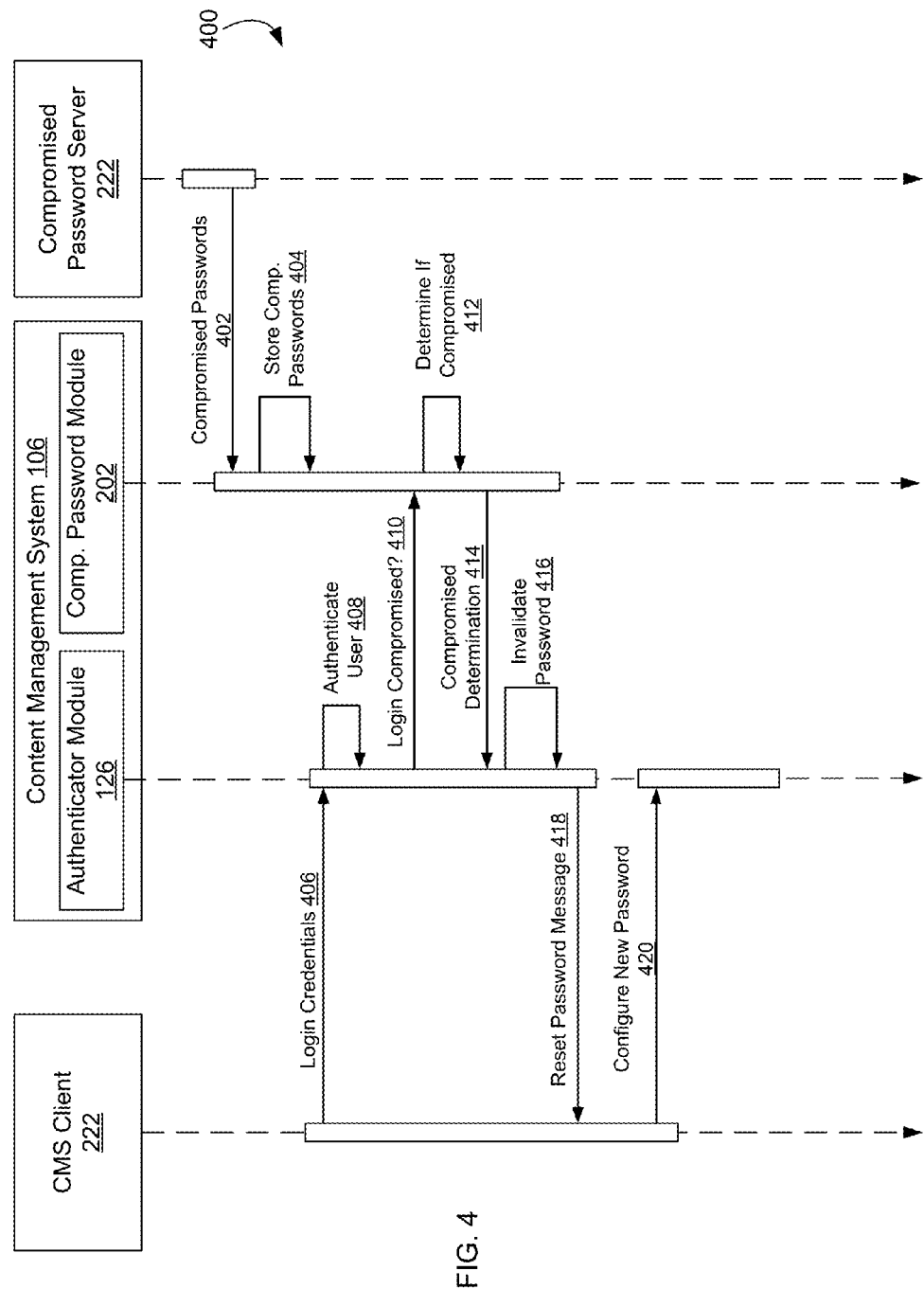
FIG. 4 is a component interaction diagram illustrating example interactions between the components of the compromised login credential detection system.

FIG. 4. is a component interaction diagram 400 illustrating example interactions between the components of compromised login credential detection system 200. For example, compromised password module 202 of content management system 106 can receive compromised passwords (402) from compromised password server 222. Compromised password module 202 can rehash the hashed passwords received from compromised password server 222 and store the compromised passwords (404) in compromised password database 204.

After storing the compromised passwords, authenticator module 126 can receive user login credentials (406) for a user account of content management system 106. In response to receiving the user login credentials, authenticator module 408 can authenticate the user based on the login credentials. After authenticating the user (or in parallel with authentication), authenticator module 126 can send the login credentials (e.g., account identifier and password) to compromised password module 202 so that compromised password module 202 can determine whether the password for the user account has been compromised (410).

In response to receiving the user login credentials, compromised password module 202 can determine whether the user login credentials have been compromised (412). For example, compromised password module 202 can generate a hash value using the same hashing algorithm (or algorithms) used to generate the password hash values stored in compromised password database 204 can compare the generated password hash value to the stored password hash value in compromised password database 204. When the generated password hash value matches a password hash value associated with the user account identifier and stored in compromised password database 204, compromised password module 202 can determine that the user's password has been compromised. When the generated password hash value does not match a password hash value associated with the user account identifier and stored in compromised password database 204, compromised password module 202 can determine that the user's password has not been compromised. Compromised password module 202 can then send (414) the compromised password determination (e.g., compromised, not compromised) to authenticator module 126. When the compromised password determination is that the user's password has not been compromised, authenticator module 126 can allow the user to login to content management system 106 using the user's current login credentials.

In response to receiving a compromised password determination that indicates that the user's password has been compromised, authenticator module 126 can invalidate the user's password (416). For example, authenticator module 126 can update user password database 204 to indicate that the user's password has expired and move the current password hash value for the user's account in user password database to the compromised password list for the user's account.

After expiring the user's password, authenticator module can send the user a reset password message (418). For example, the reset password message can be an email message (or other electronic message) that includes a login token that the user can use or invoke to navigate to a user interface (e.g., web page) of content management system 106 and configure a new password (420) for the user's account. When the user provides a new password, authenticator module 126 can compare the new password to the list of compromised passwords to ensure that the user does not use a compromised password for the user's content management system account, as described above.

Figure 5A:
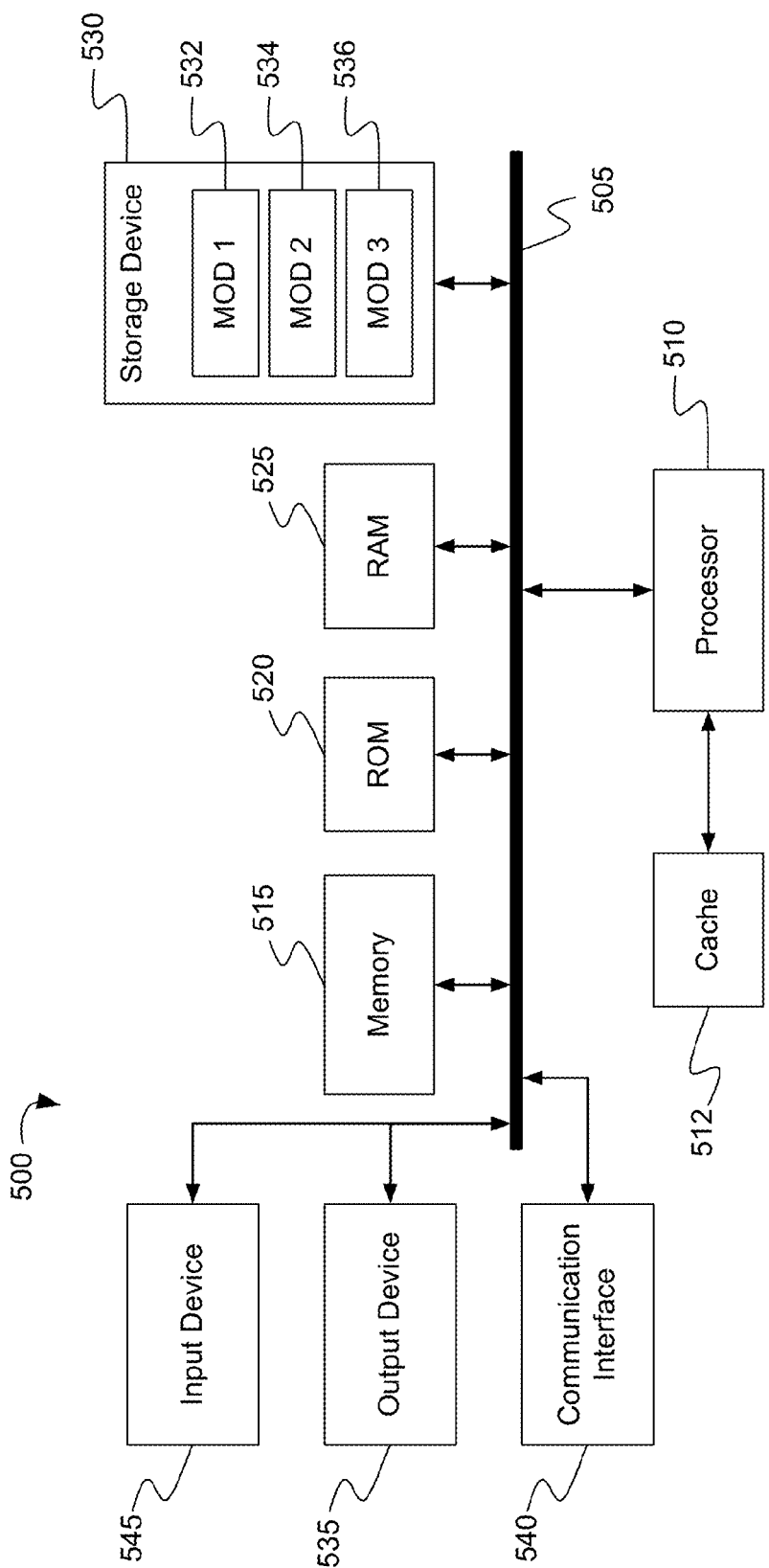
FIG. 5A shows an example possible system embodiment for implementing various embodiments of the present technology.
Figure 5B:
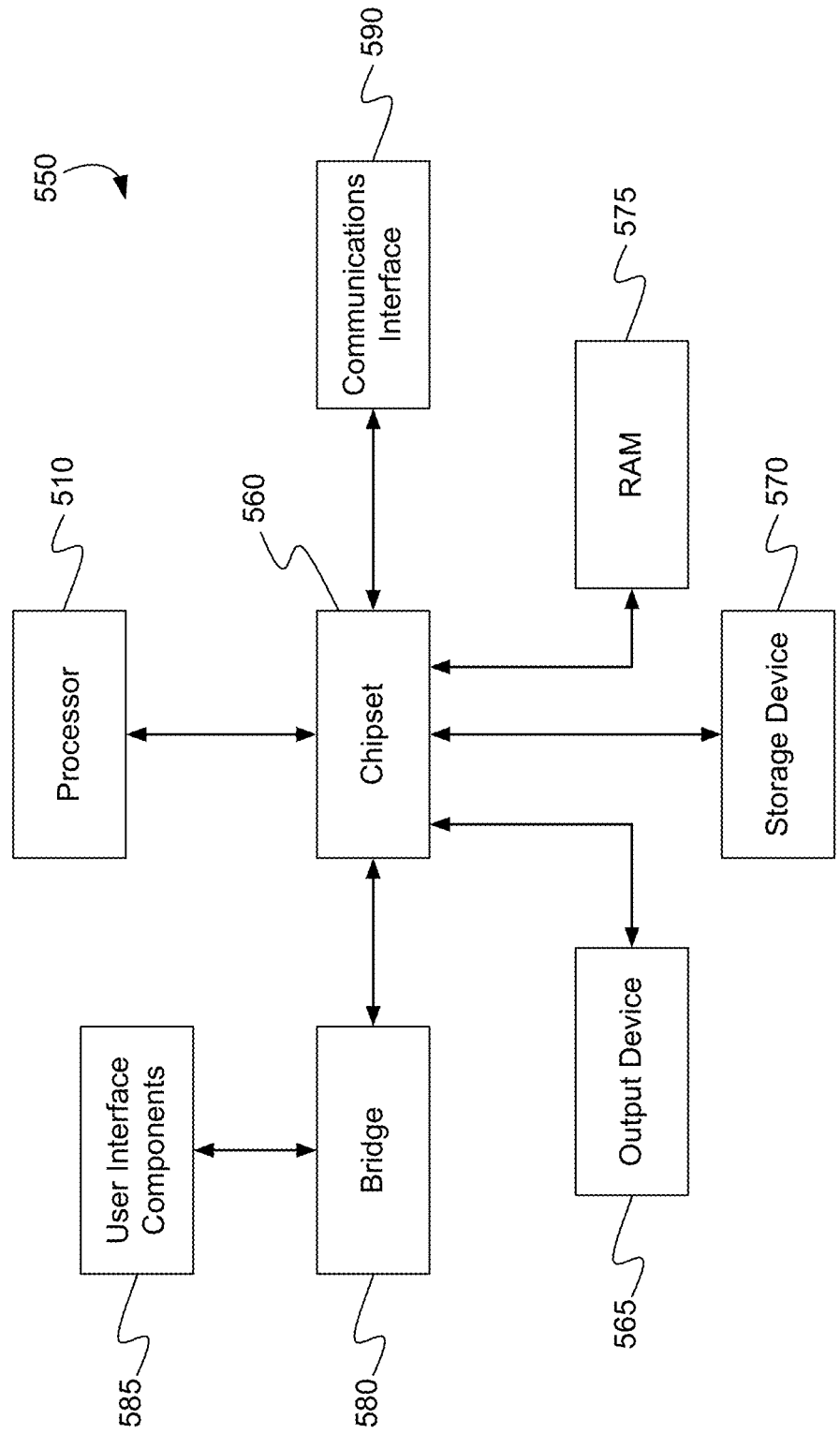
FIG. 5B shows an example possible system embodiment for implementing various embodiments of the present technology.

FIG. 5A and FIG. 5B show example possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Example system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 510, representative of any number of physically and/or logically distinct resources capable of executing software, firmware, and hardware configured to perform identified computations. Processor 510 can communicate with a chipset 560 that can control input to and output from processor 510. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 510 analyzing data stored in storage 570 or 575. Further, the machine can receive inputs from a user via user interface components 585 and execute appropriate functions, such as browsing functions by interpreting these inputs using processor 510.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving, by a computing device of a content management system, user login credentials associated with a user account of the content management system, the user login credentials including a first account identifier and an unhashed first password;
obtaining, by the computing device, account login credentials for accounts managed by the content management system, the account login credentials including a plurality of second account identifiers and corresponding second password hash values, the corresponding second password hash values generated using a first hashing algorithm;
generating, by the computing device, a first user password hash value based on a first hashing algorithm and the unhashed first password;
authenticating, by the computing device, the user login credentials based on the first user password hash value and the account login credentials;
obtaining, by the computing device, compromised login credentials including a plurality of third account identifiers and corresponding third password hash values, the corresponding third password hash values generated using a second hashing algorithm distinct from the first hashing algorithm;
generating, by the computing device, a second user password hash value based on the second hashing algorithm and the unhashed first password;
determining, by the computing device, that the unhashed first password is compromised based on the second user password hash value and the compromised login credentials.

2. The method of claim 1, wherein the compromised login credentials correspond to user accounts with other computing systems distinct from the content management system.

3. The method of claim 1, further comprising:
receiving, by the computing device, the compromised login credentials from a server device distinct from the content management system.

4. The method of claim 1, wherein the user login credentials are received from a client device of the content management system operated by a user, and further comprising:
in response to determining that the unhashed first password has been compromised, prompting the user to select a new password for the user account.

5. The method of claim 4, further comprising:
storing, by the computing device, a collection of compromised password hash values generated using the first hashing algorithm in association with the first account identifier, where each of the compromised password hash values in the a collection of compromised password hash values was generated using the first hashing algorithm; and
preventing, by the computing device, the user from selecting a value for the new password that corresponds to a compromised password hash value in the collection of compromised password hash values.

6. The method of claim 1, further comprising:
comparing, by the computing device, the second user password hash value and at least one of the third password hash values corresponding to the first account identifier; and
determining, by the computing device, that the unhashed first password has been compromised based on the comparison.

7. The method of claim 1, wherein the third password hash values are generated based on the first hashing algorithm and the second hashing algorithm.

8. A non-transitory computer-readable medium including one or more sequences of instructions that, when executed by one or more processors, causes:
receiving, by a computing device of a content management system, user login credentials associated with a user account of the content management system, the user login credentials including a first account identifier and an unhashed first password;
authenticating, by the computing device, the user login credentials based on a first user password hash value generated from the unhashed first password using a first hashing algorithm;
determining, by the computing device, that the unhashed first password is compromised based on a second user password hash value generated from the unhashed first password using a second hashing algorithm, where the first hashing algorithm is distinct from the second hashing algorithm.

9. The non-transitory computer-readable medium of claim 8, further comprising:
obtaining, by the computing device, compromised login credentials including a plurality of third account identifiers and corresponding third password hash values, the corresponding third password hash values generated using the second hashing algorithm, wherein the compromised login credentials correspond to user accounts with other computing systems distinct from the content management system; and
determining, by the computing device, that the unhashed first password has been compromised based on a comparison of the second user password hash value with the compromised login credentials.

10. The non-transitory computer-readable medium of claim 9, wherein the instructions cause:
receiving, by the computing device, the compromised login credentials from a server device distinct from the content management system.

11. The non-transitory computer-readable medium of claim 9, wherein the instructions cause:
comparing, by the computing device, the second user password hash value and at least one of the third password hash values corresponding to the first account identifier; and
determining, by the computing device, that the unhashed first password has been compromised based on the comparison.

12. The non-transitory computer-readable medium of claim 9, wherein the third password hash values are generated based on the first hashing algorithm and the second hashing algorithm.

13. The non-transitory computer-readable medium of claim 8, wherein the user login credentials are received from a client device of the content management system operated by a user, and wherein the instructions cause:
in response to determining that the unhashed first password has been compromised, prompting the user to select a new password for the user account.

14. The non-transitory computer-readable medium of claim 13, wherein the instructions cause:
storing, by the computing device, a collection of compromised password hash values generated using the first hashing algorithm in association with the first account identifier, where each of the compromised password hash values in the a collection of compromised password hash values was generated using the first hashing algorithm; and preventing, by the computing device, the user from selecting a value for the new password that corresponds to a compromised password hash value in the collection of compromised password hash values.

15. A system comprising:
one or more processors; and
a non-transitory computer-readable medium including one or more sequences of instructions that, when executed by the one or more processors, causes:
receiving, by a computing device of a content management system, user login credentials associated with a user account of the content management system, the user login credentials including a first account identifier and an unhashed first password;
authenticating, by the computing device, the user login credentials based on a first user password hash value generated from the unhashed first password using a first hashing algorithm;
determining, by the computing device, that the unhashed first password is compromised based on a second user password hash value generated from the unhashed first password using a second hashing algorithm, where the first hashing algorithm is distinct from the second hashing algorithm.

16. The system of claim 15, further comprising:
obtaining, by the computing device, compromised login credentials including a plurality of third account identifiers and corresponding third password hash values, the corresponding third password hash values generated using the second hashing algorithm, wherein the compromised login credentials correspond to user accounts with other computing systems distinct from the content management system; and
determining, by the computing device, that the unhashed first password has been compromised based on a comparison of the second user password hash value with the compromised login credentials.

17. The system of claim 16, wherein the instructions cause:
receiving, by the computing device, the compromised login credentials from a server device distinct from the content management system.

18. The system of claim 16, wherein the instructions cause:
comparing, by the computing device, the second user password hash value and at least one of the third password hash values corresponding to the first account identifier; and
determining, by the computing device, that the unhashed first password has been compromised based on the comparison.

19. The system of claim 16, wherein the third password hash values are generated based on the first hashing algorithm and the second hashing algorithm.

20. The system of claim 15, wherein the user login credentials are received from a client device of the content management system operated by a user, and wherein the instructions cause:
in response to determining that the unhashed first password has been compromised, prompting the user to select a new password for the user account.

21. The system of claim 20, wherein the instructions cause:
storing, by the computing device, a collection of compromised password hash values generated using the first hashing algorithm in association with the first account identifier, where each of the compromised password hash values in the a collection of compromised password hash values was generated using the first hashing algorithm; and
preventing, by the computing device, the user from selecting a value for the new password that corresponds to a compromised password hash value in the collection of compromised password hash values.

* * * * *